US007448948B2

(12) United States Patent
Hughs-Baird et al.

(10) Patent No.: US 7,448,948 B2
(45) Date of Patent: Nov. 11, 2008

(54) GAMING DEVICE HAVING AWARD POSITIONS WITH ASSOCIATED CHARACTERISTICS

(75) Inventors: Andrea C. Hughs-Baird, Reno, NV (US); Megan N. Schlegel, Reno, NV (US)

(73) Assignee: IGT, Reno, NV (US)

( * ) Notice: Subject to any disclaimer, the term of this patent is extended or adjusted under 35 U.S.C. 154(b) by 207 days.

(21) Appl. No.: 10/657,588

(22) Filed: Sep. 8, 2003

(65) Prior Publication Data

US 2005/0054421 A1 Mar. 10, 2005

(51) Int. Cl.
*A63F 9/24* (2006.01)
*G06F 17/00* (2006.01)
*A63B 71/00* (2006.01)

(52) U.S. Cl. ............................ 463/20; 463/16; 463/19; 463/21; 463/26; 273/138.1; 273/142; 273/143

(58) Field of Classification Search ...................... None
See application file for complete search history.

(56) References Cited

U.S. PATENT DOCUMENTS 2,077,124 A * 4/1937 Miller et al. .......... 273/142 HA
3,633,915 A * 1/1972 Lippert ....................... 273/274
4,346,900 A * 8/1982 Lamlee ....................... 273/274
4,448,419 A 5/1984 Telnaes
4,492,378 A * 1/1985 Williams ............ 273/142 HA
4,624,459 A 11/1986 Kaufman
4,695,053 A 9/1987 Vazquez, Jr. et al.
4,775,155 A 10/1988 Lees
5,184,821 A * 2/1993 Korenek .................. 273/138.2
5,205,555 A 4/1993 Hamano
5,259,616 A * 11/1993 Bergmann ................... 463/17
5,324,041 A 6/1994 Boylan et al.
5,423,539 A 6/1995 Nagao
5,449,173 A 9/1995 Thomas et al.
5,536,016 A 7/1996 Thompson
5,542,669 A 8/1996 Charron et al.
5,553,851 A * 9/1996 Malavazos et al. ....... 273/142 E
5,560,603 A 10/1996 Seelig et al.

(Continued)

FOREIGN PATENT DOCUMENTS

EP 219305 A2 * 4/1987

(Continued)

OTHER PUBLICATIONS

All Grown Up advertisement written by IGT/Sodak, published in 2003.

(Continued)

*Primary Examiner*—Robert E Pezzuto
*Assistant Examiner*—Sunit Pandya
(74) *Attorney, Agent, or Firm*—Bell, Boyd & Lloyd LLP

(57) ABSTRACT

A gaming device including a plurality of award values and a plurality of modifier values. A characteristic is associated with at least one award value position and at least one modifier value position. The gaming device provides an award to a player associated with at least one award value position and at least one modifier value position, wherein the award includes an additional award when the award value position and the modifier value position contain the same or related characteristics.

24 Claims, 14 Drawing Sheets

U.S. PATENT DOCUMENTS

| | | | | | |
|---|---|---|---|---|---|
| 5,584,763 | A | * | 12/1996 | Kelly et al. | 463/16 |
| 5,611,535 | A | | 3/1997 | Tiberio | |
| 5,722,891 | A | | 3/1998 | Inoue | |
| 5,769,716 | A | | 6/1998 | Saffari et al. | |
| 5,772,509 | A | | 6/1998 | Weiss | |
| 5,788,573 | A | | 8/1998 | Baerlocher et al. | |
| 5,823,874 | A | | 10/1998 | Adams | |
| 5,848,932 | A | * | 12/1998 | Adams | 463/20 |
| 5,851,148 | A | | 12/1998 | Brune et al. | |
| 5,882,261 | A | | 3/1999 | Adams | |
| 5,911,418 | A | | 6/1999 | Adams | |
| 5,919,091 | A | | 7/1999 | Bell et al. | |
| 5,935,002 | A | | 8/1999 | Falciglia | |
| 5,951,397 | A | | 9/1999 | Dickinson | |
| 5,988,643 | A | | 11/1999 | Awada | |
| 5,989,121 | A | | 11/1999 | Sakamoto | |
| 6,004,207 | A | | 12/1999 | Wilson, Jr. et al. | |
| 6,015,346 | A | | 1/2000 | Bennett | |
| 6,056,642 | A | | 5/2000 | Bennett | |
| 6,059,658 | A | * | 5/2000 | Mangano et al. | 463/16 |
| 6,089,976 | A | | 7/2000 | Schneider et al. | |
| 6,089,977 | A | | 7/2000 | Bennett | |
| 6,105,962 | A | * | 8/2000 | Malavazos et al. | 273/143 R |
| 6,126,542 | A | | 10/2000 | Fier | |
| 6,129,355 | A | | 10/2000 | Hahn et al. | |
| 6,142,873 | A | | 11/2000 | Weiss et al. | |
| 6,159,098 | A | | 12/2000 | Slomiany et al. | |
| 6,164,652 | A | | 12/2000 | Lauretta et al. | |
| 6,173,955 | B1 | | 1/2001 | Perrie et al. | |
| 6,174,235 | B1 | | 1/2001 | Walker et al. | |
| 6,217,022 | B1 | * | 4/2001 | Astaneha | 273/138.1 |
| 6,224,483 | B1 | | 5/2001 | Mayeroff | |
| 6,227,969 | B1 | | 5/2001 | Yoseloff | |
| 6,227,971 | B1 | | 5/2001 | Weiss | |
| 6,231,442 | B1 | | 5/2001 | Mayeroff | |
| 6,299,165 | B1 | | 10/2001 | Nagano | |
| 6,305,686 | B1 | | 10/2001 | Perrie et al. | |
| 6,309,300 | B1 | | 10/2001 | Glavich | |
| 6,312,334 | B1 | | 11/2001 | Yoseloff | |
| 6,315,663 | B1 | | 11/2001 | Sakamoto | |
| 6,336,860 | B1 | * | 1/2002 | Webb | 463/22 |
| 6,346,043 | B1 | | 2/2002 | Colin et al. | |
| 6,347,996 | B1 | | 2/2002 | Gilmore et al. | |
| 6,364,767 | B1 | * | 4/2002 | Brossard et al. | 463/20 |
| 6,398,220 | B1 | * | 6/2002 | Inoue | 273/142 R |
| 6,536,766 | B1 | * | 3/2003 | Deitch et al. | 273/287 |
| 6,644,664 | B2 | * | 11/2003 | Muir et al. | 273/146 |
| 6,659,863 | B2 | * | 12/2003 | Ashley et al. | 463/13 |
| 6,692,355 | B2 | | 2/2004 | Baerlocher et al. | |
| 6,705,944 | B2 | * | 3/2004 | Luciano | 463/20 |
| 6,793,577 | B1 | * | 9/2004 | Wilkins et al. | 463/16 |
| 6,855,052 | B2 | * | 2/2005 | Weiss et al. | 463/16 |
| 6,855,056 | B2 | * | 2/2005 | Inoue | 463/31 |
| 6,988,731 | B2 | * | 1/2006 | Inoue | 273/142 H |
| 2002/0137559 | A1 | | 9/2002 | Baerlocher | |
| 2003/0036420 | A1 | | 2/2003 | Baerlocher et al. | |
| 2003/0045338 | A1 | | 3/2003 | Dolloff et al. | |
| 2003/0064773 | A1 | | 4/2003 | Baerlocher et al. | |
| 2003/0195027 | A1 | | 10/2003 | Baerlocher et al. | |
| 2004/0014517 | A1 | * | 1/2004 | Inoue | 463/20 |

FOREIGN PATENT DOCUMENTS

| | | | | |
|---|---|---|---|---|
| EP | 375190 | A2 | * | 6/1990 |
| EP | 0945837 | A2 | | 9/1999 |
| GB | 2170938 | A | * | 8/1986 |
| GB | 2333880 | A | * | 8/1999 |
| WO | WO9732285 | | | 9/1997 |
| WO | WO 00/12186 | | | 3/2000 |

OTHER PUBLICATIONS

Austin Powers brochure written by IGT, published in 2001.
Catch a Wave advertisement written by IGT, published in 2001.
Creepy and Kooky written by Frank Legato, published by Strictly Slots in Jul. 2000, pp. 52-54.
On the Money written by Casino Data Systems, published by Strictly Slots in Dec. 2000, p. 49.
Red, White and Blue written by International Game Technology, published by Strictly Slots in 2000.
Slot Machines A Pictorial History of the First 100 Years, 5th ed., written by Marshall Fey, published in 1983, p. 17.
Slots 2003 written by Melissa Raimondi, published by Strictly Slots in Jan. 2003, pp. 50-57.
South Park brochure written by IGT, published by IGT in 2000.
The Price is Right brochure written by IGT, published by IGT in 2001.
UNO™ and Magic 8 Ball™ Slots Offer a One-Two Punch of Fun½ written by MegaJackpots™ News, undated, p. 22.
UNO Original instructions written by Mattel, Inc., published in 1998.
Take Your Pick Article written by Anchor Games, Strictly Slots published in Mar. 2001.
Slot Machines on Parade (portions of book) written by Robert N. Geddes, The Mead Company published in Oct. 1980.
Wheel of Fortune® Slots advertisement, published prior to Sep. 2003.
Wheel of Fortune advertisement, published prior to Sep. 2003.

* cited by examiner

GAMING DEVICE HAVING AWARD POSITIONS WITH ASSOCIATED CHARACTERISTICS

CROSS-REFERENCE TO RELATED APPLICATIONS

The present invention relates to the following co-pending commonly owned U.S. patent applications: "GAMING DEVICE HAVING A MULTI-CHARACTERISTIC MATCHING GAME," Ser. No. 09/813,698, "GAMING DEVICE HAVING A MULTI-ROUND MULTI-CHARACTERISTIC MATCHING GAME," Ser. No. 10/243,706, "GAMING DEVICE HAVING A MULTI-CHARACTERISTIC MATCHING GAME INCLUDING SELECTION INDICATORS," Ser. No. 10/243,192, "GAMING DEVICE HAVING A MULTI-ROUND, MULTI-CHARACTERISTICS CARD GAME," Ser. No. 10/661,219, and "GAMING DEVICE HAVING MULTI-CHARACTERISTIC SYMBOL GAME WITH MULTIPLE AWARD COMPONENTS," Ser. No. 09/967,546.

This application relates to the following copending commonly owned patent applications: "GAMING DEVICE HAVING MULTIPLE INTERACTING INDEPENDENTLY OPERABLE WHEELS," Ser. No. 10/953,822, and "GAMING DEVICE HAVING MECHANICAL INDICATOR WITH A MULTIPLE WIN SECTION," Ser. No. 10/956,222.

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having a game such as a bonus game, which provides a player with an additional award when a generated award value position and generated modifier value position have the same or related characteristics.

Gaming devices provide enjoyment, entertainment and excitement to players, in part, because they may ultimately lead to monetary awards for the players. Gaming devices also provide enjoyment, entertainment and excitement to the players because they are fun to play. Bonus games, in particular, provide gaming device manufacturers with the opportunity to add enjoyment and excitement to that which is already expected from a primary or base game of the gaming device. Bonus games generally provide awards to the players and enable the players to play a game that is different than the base game.

Wagering gaming devices are typically games of luck or probability, not skill. Primary or base games are set up to pay back, on average, a certain percentage of the amount of money wagered by the players. The pay back or payout percentage in most primary games is set high enough that any player who plays a few hands or spins of the reels usually wins at least one game. That is, in most primary games in gaming devices it is not too difficult to experience some level of success. Secondary or bonus games are typically set up for the player to succeed. The player usually wins an award in a bonus game. In bonus game play, the goal is often to maximize the possible award.

Mechanical devices such as wheels have also been employed in gaming devices, such as to indicate a bonus award. In these mechanical devices, the symbols such as the symbols representing the awards are fixed.

While the prospect of winning an award provides a constant source of excitement to players, certain players enjoy new and different games. A continuing need therefore exists to provide new and different gaming devices that issue awards in an exciting and enjoyable manner.

SUMMARY OF THE INVENTION

The present invention provides a gaming device and a method of operating a gaming device for a primary or secondary game. One embodiment of the gaming device of the present invention includes a plurality of first elements or positions such as award value elements or positions and a plurality of second elements or positions such as modifier value elements or positions. At least one of the award value elements or positions and at least one of the modifier value elements or positions each include the same or related characteristics. Upon the occurrence of a sequence generating event, such as depositing a token, selecting a play or spin button, or a triggering event in a primary game, an award associated with at least one award value element or position is generated and a modifier associated with at least one modifier value element or position is generated. The award and modifier are used to determine the player's award. When the generated award value element or position and the generated modifier value element or position each include a same or a related characteristic, the player is provided an additional award.

The arrangement and associations of the characteristics with the elements or positions may vary. For instance, one or more of the same or related characteristics may be associated with one or more of the award value elements or positions and one or more of the modifier value elements or positions. A plurality of characteristics may be associated with one or more of the award value elements or positions and/or one or more of the modifier value elements or positions. One of, a plurality of or each of the award value elements or positions and modifier value elements or positions may have one or more of the characteristics. Any suitable arrangement of these characteristics is contemplated by the present invention.

In one embodiment, at least one of the plurality award value elements or positions and at least one of the plurality of modifier value elements or positions each include at least one designated characteristic such as a color, symbol, image, indicia, pattern, or other indication of the characteristic. The gaming device provides an additional award to the player when the generated award value and modifier value elements or positions include the same or related characteristics (i.e., a designated pair of characteristics). For example, an additional award may be earned when the generated award value and modifier value elements or positions both include or are of the same characteristic, such as the same color. As a further example, an additional award may be earned when the generated award value and modifier value elements or positions contain related characteristics such as a horse and jockey.

The award value elements or positions, modifier value positions and characteristics may be displayed in any suitable configuration or display. In one embodiment, the award value elements or positions and the modifier value elements or positions are randomly selected and displayed by the display device. In one embodiment, the award value positions and the modifier value positions are displayed adjacent to one another. In one embodiment, the award value positions and the modifier value positions are each displayed in an open or closed path. In another embodiment, the award value positions are displayed in one suitable manner and the modifier value positions are displayed in another suitable manner.

In one embodiment, the gaming device includes a wheel including a plurality of positions displaying the award value elements or positions. The modifier value elements or positions are separately displayed in a plurality of positions by the display device. When a game sequence generates an award value position and modifier value position containing the same or related characteristics, the game provides the player an additional award such as a plurality of credits, a free primary or secondary game, or other suitable award or outcome.

In one embodiment, the gaming device includes a set of two concentrically displayed wheels defining an outer area and an inner area each containing a plurality of positions. In one embodiment, the award values are displayed in the positions of the outer area, and the modifier values are displayed in the positions of the inner area. Other embodiments may include other suitable configurations. In one embodiment, an award is provided to the player based on the award value and the modifier value of the indicated values after a random or other suitable generation of at least one of each type of the values. For instance, when the wheels stop spinning, one of the positions of each of the outer and inner wheels are indicated to determine the player's award. If the two indicated positions each include at least one of the same or related characteristics, an additional award is provided to the player.

To provide further player excitement and interaction, one embodiment of the gaming device enables the player to control or appear to control when the wheels start and stop spinning. In a further embodiment, the gaming device enables the player to accept or reject a generated award.

In one embodiment, the modifier values are multipliers, wherein the value of a generated award value is multiplied by the value of the generated modifier. In another embodiment, the modifier value is added to the award value. In further embodiments, the modifier values may result in the player receiving any suitable award such as monetary awards, free primary or secondary games, or other prizes.

The additional award provided to the player when the generated first element or position and the generated second element or position include the same or a related characteristic may be in any suitable form. It should also be appreciated that additional groups or sets of elements or positions may be employed in accordance with the present invention, wherein the additional award is provided to the player when a designated number such as all of the indicated positions (such as one in each group) includes the same or related characteristics.

It should be appreciated that one or more award value wheels or other award value indicators, one or more modifier value wheels or other indicators, one or more other outcome wheels or other indicators, one or more characteristic wheels or other indicators, and any combination thereof may be employed in accordance with the present invention. Accordingly, various embodiments may include indicators which indicate the same or different types of outcomes and the characteristics. Also, one or more indicators may indicate characteristics without any other values or outcomes.

It is therefore an advantage of the present invention to a gaming device which provides a player with an additional award when a generated first element or position and generated second element or position have the same or related characteristics.

A further advantage of the present invention is to provide increased entertainment value by providing enhanced display features and the potential for greater player awards.

A further advantage of the present invention is to provide increased player interaction, further adding to the enjoyment to the game.

Additional features and advantages of the present invention are described in, and will be apparent from, the following Detailed Description of the Invention and the figures.

DETAILED DESCRIPTION OF THE INVENTION

Figure 1A:
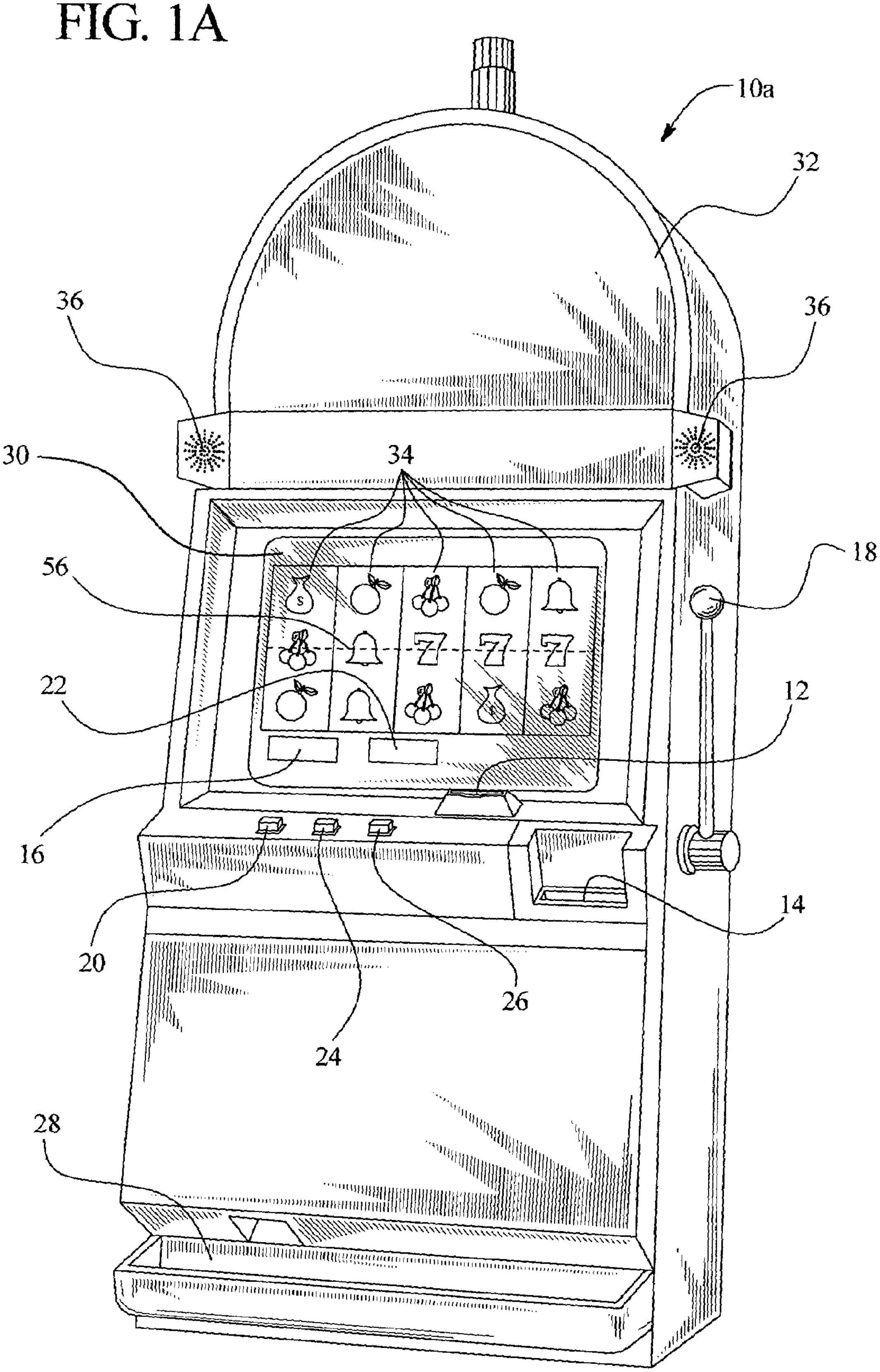
FIGS. 1A and 1B are front perspective views of various embodiments of a slot machine embodiment of the gaming device of the present invention.
Figure 1B:
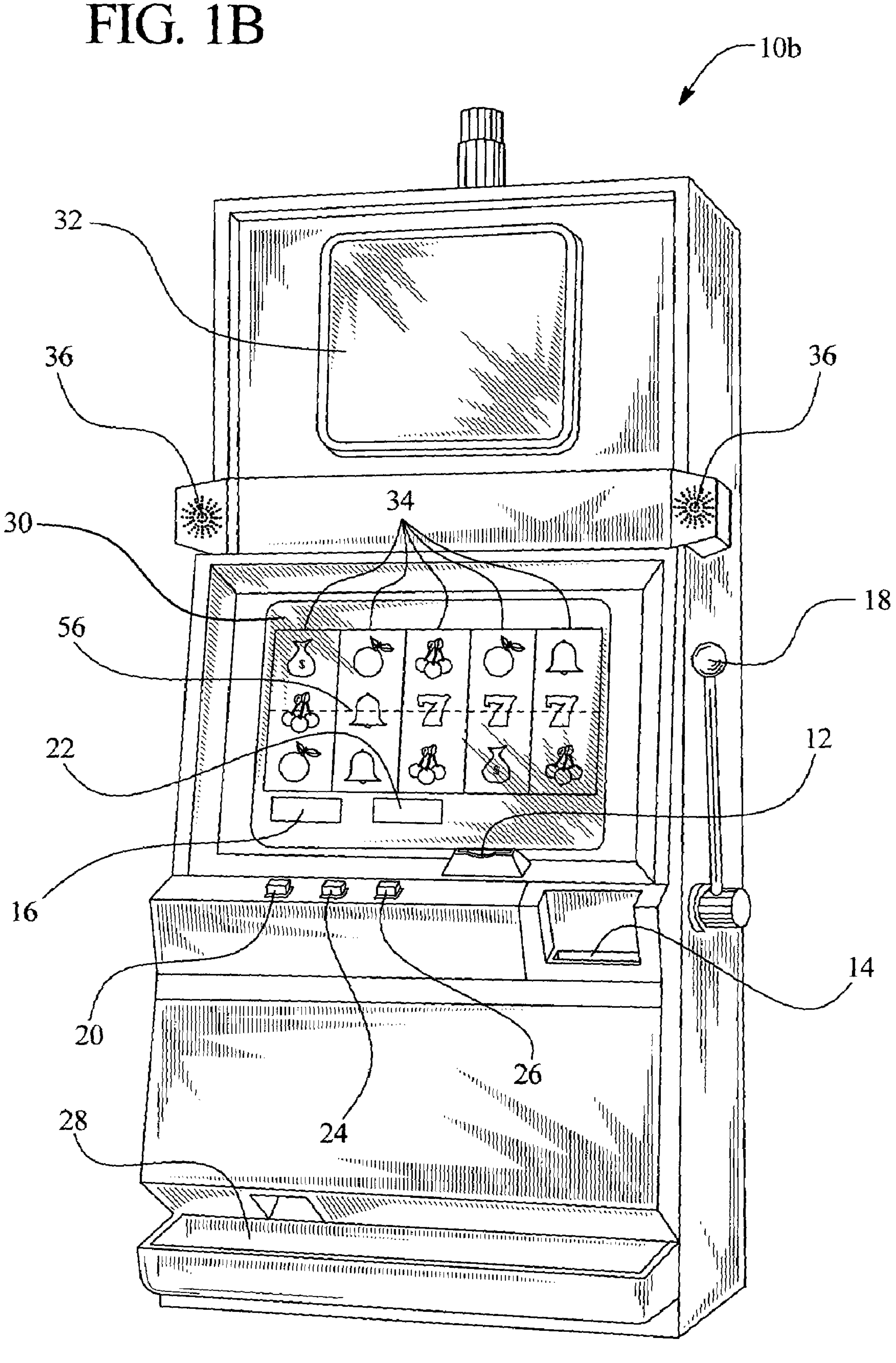

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
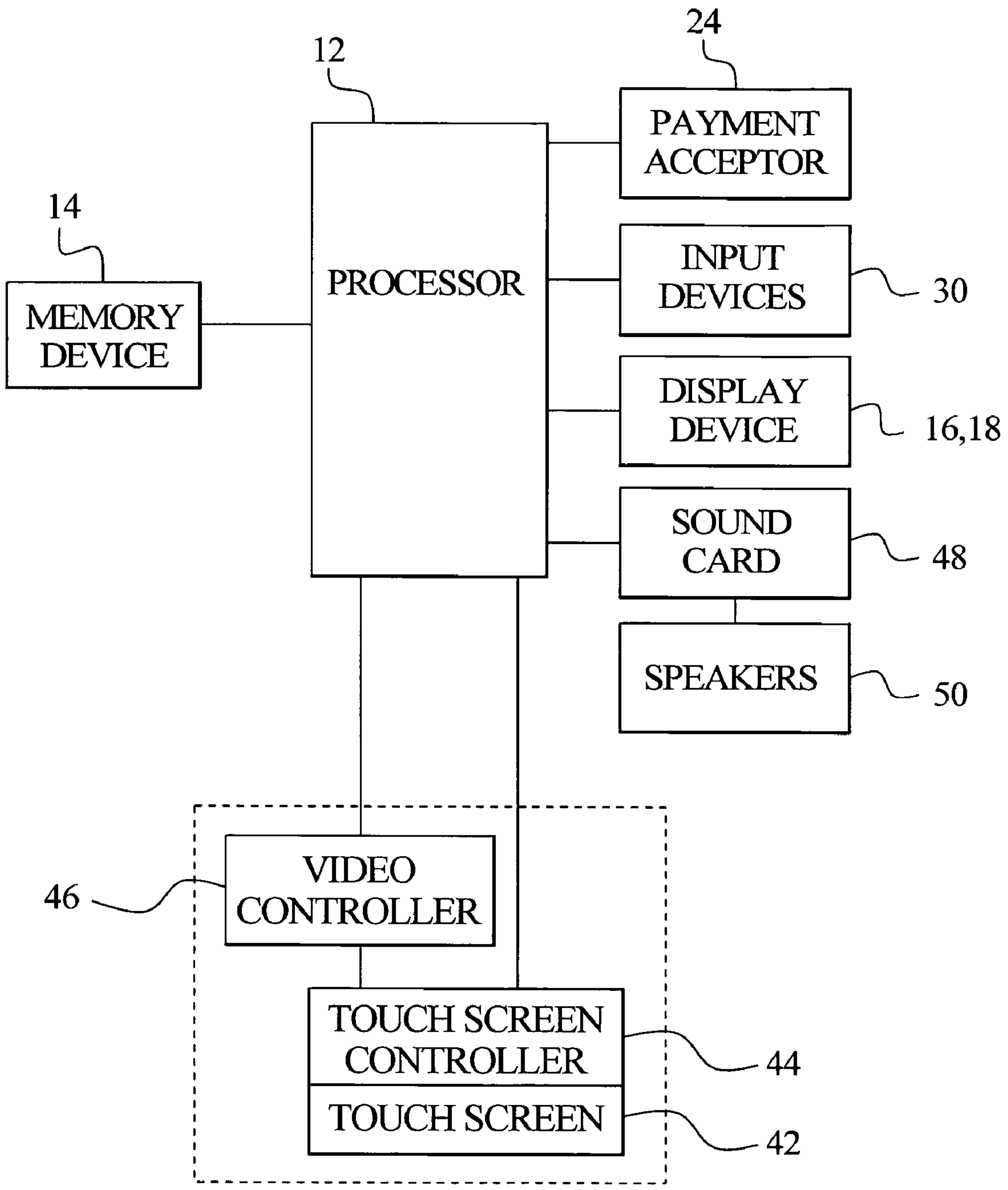
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
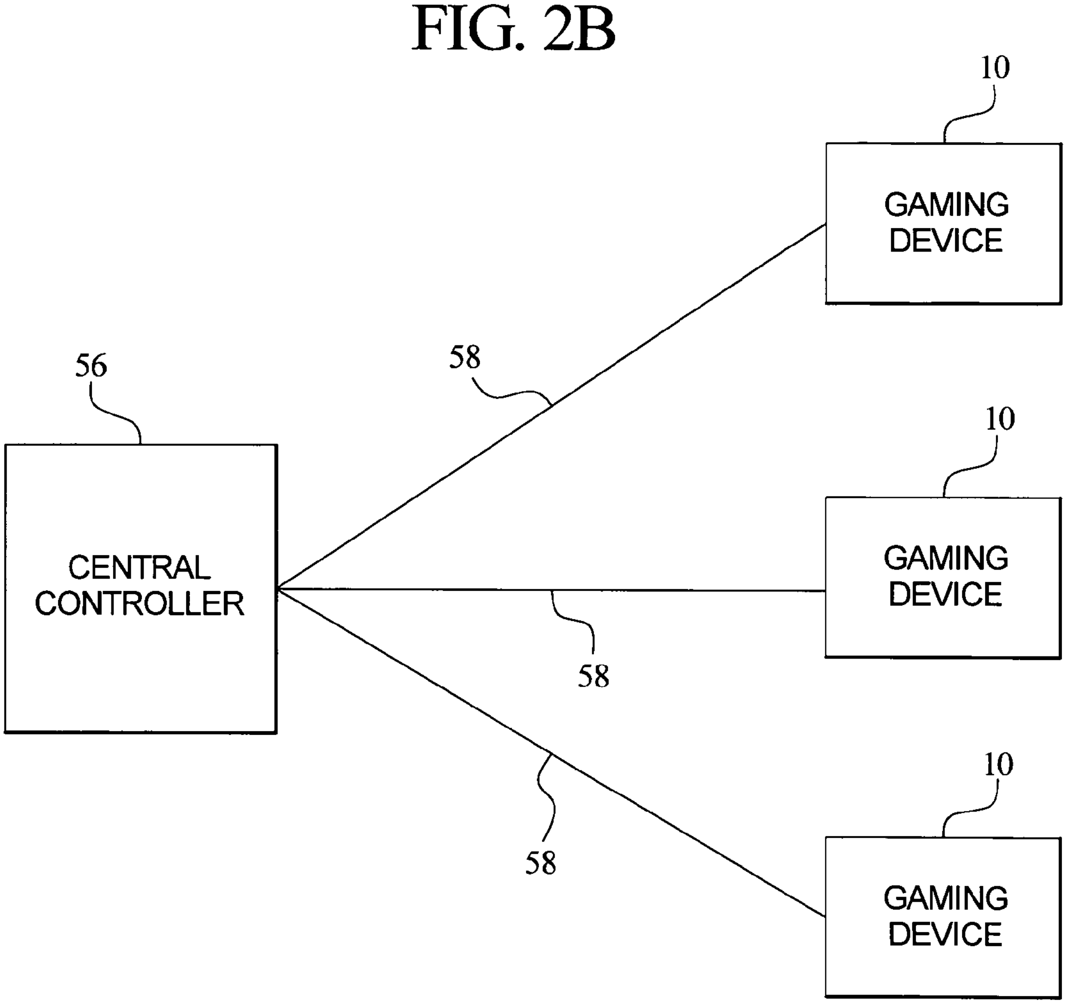
FIG. 2B is a schematic block diagram of various gaming devices employing the wagering game of the present invention, wherein the devices are networked to a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Selections in Separate Groups Including Same or Related Characteristics

In one embodiment, the present invention provides a mechanical or video display for a primary or secondary game which includes a plurality or group of first elements, positions or selections such as award value positions and a plurality or group of second elements, positions or selections such as modifier value positions, wherein at least one of the first or award value positions and at least one of the second or modifier value positions each further include a characteristic. Upon the occurrence of a sequence triggering event, at least one award value position and at least one modifier value position are generated, and the player is provided an award associated with the generated award value and modifier value. When the generated award value and modifier value positions include the same or related characteristics, the game provides the player with an additional award.

Figure 3:
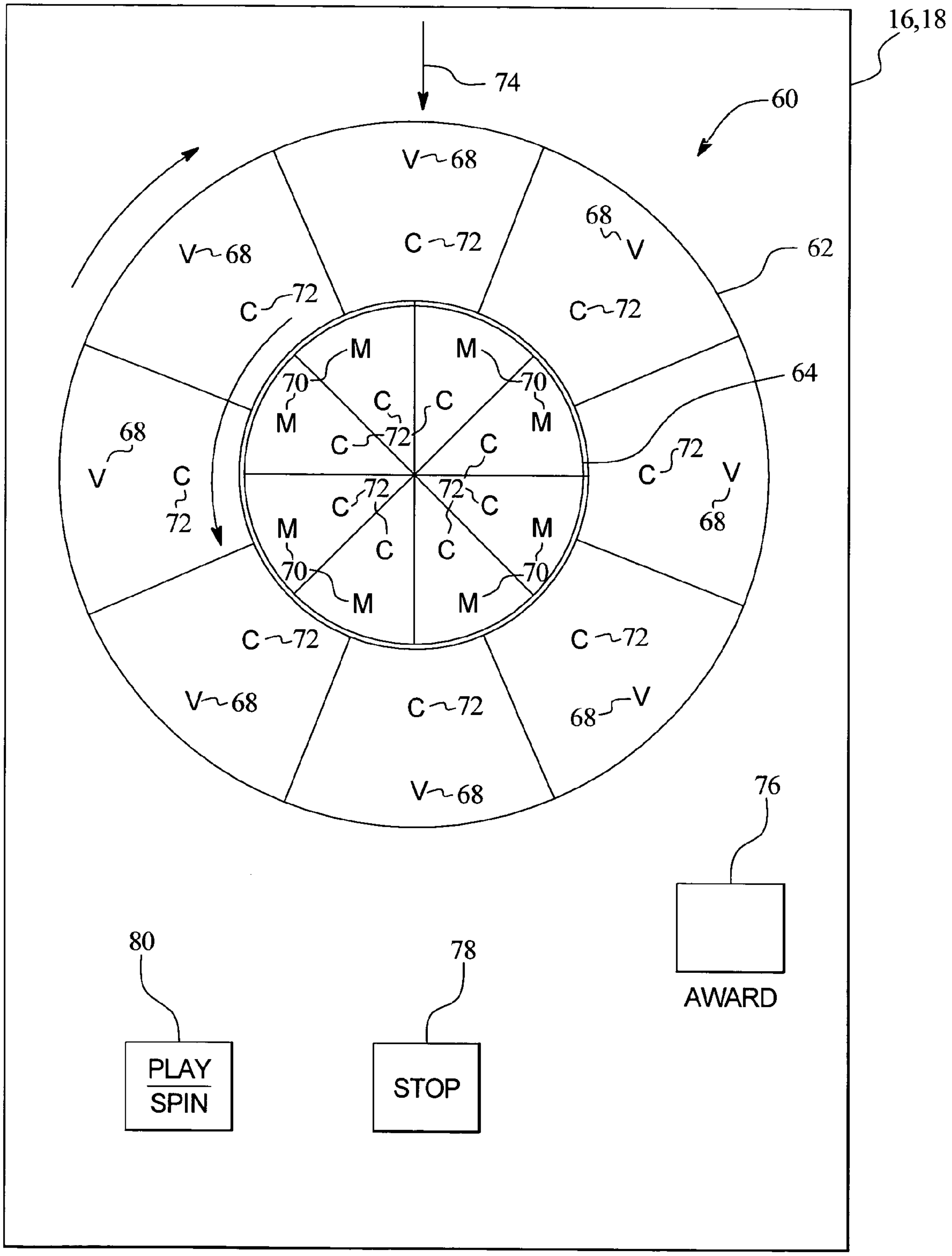
FIG. 3 is a front plan view of a display device illustrating the game configuration of one embodiment of the present invention.

Turning now to FIG. 3, one embodiment of the present invention includes a display 16 or 18 of the gaming device 10 which displays a set of concentrically arranged wheels or circular members defining an outer area 62 and an inner area 64. In alternative embodiments, one or both of the wheels are mechanical and concentrically arranged. Each of the outer and inner areas include a plurality of positions, and each position includes either an award value 68, generally labeled "V" or a modifier value 70, generally labeled "M". In this illustrated embodiment, the award values 68 are displayed in the positions of the outer area 62 and the modifier values 70 are displayed in the positions of the inner area 64. In the illustrated embodiment, each of the positions in the inner and outer areas 62 and 64 include a characteristic 72, generally labeled "C." Alternatively, more than one characteristic may be included in or associated with one or more of the positions, and further alternatively less than all of the positions may include characteristics, so long as at least one position in each area includes the same or a related characteristic.

The display 16 or 18 also includes a suitable play or spin button 80, and an award display 76. In one alternative embodiment, the display 16 or 18 (which includes a touch screen) includes a stop input or button 78 which enables the player to input a decision to cause the stopping of the spinning of the wheels 62 and 64.

Upon the occurrence of a triggering event such as the activation of the play or spin button 80, the wheels spin, either in the same direction or different directions. When the wheels stop spinning, the positions of the outer 62 and inner 64 areas which are aligned along indicator 74 determine the player's award. In one embodiment, the award will include the amount of the award value of the indicated position multiplied by the modifier value of the indicated position. The game also provides the player an additional award if the award value position and modifier position include the same or related characteristics.

Figure 4:
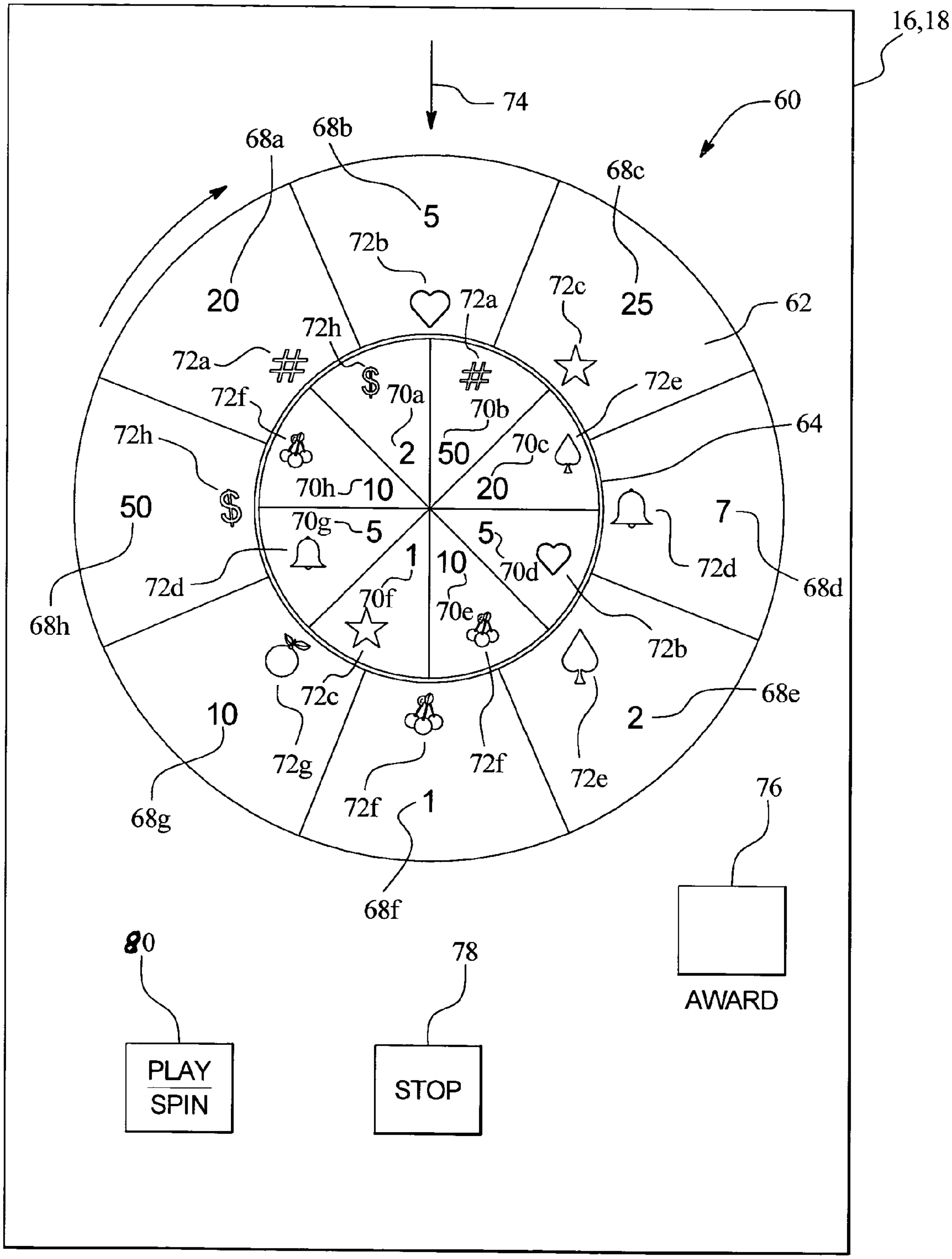
FIG. 4 is a front plan view of a display device illustrating the game configuration of one embodiment of the present invention with values and characteristics entered in the game positions.
Figure 5:
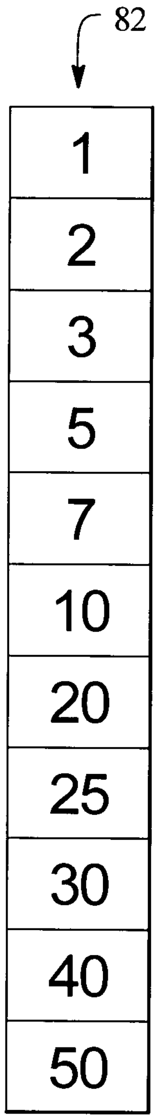
FIG. 5 is a table illustrating one possible method for supplying award values for one embodiment of the present invention.
Figure 6:
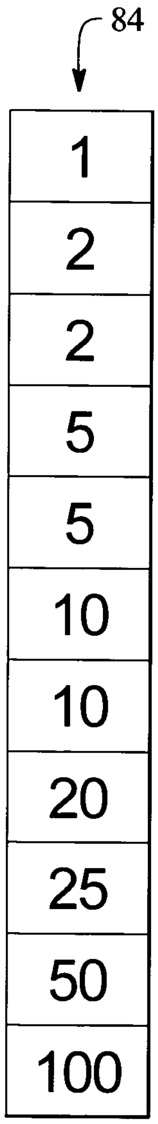
FIG. 6 is a table illustrating one possible method for supplying award modifiers for one embodiment of the present invention.

Turning now to FIG. 4, the inner 64 and outer 62 areas are shown with award values 68*a* to 68*h*, modifier values 70*a* to 70*h*, and characteristics 72*a* to 72*h*, as would be seen at the beginning of a game sequence. In one embodiment, the award values are fixed, predetermined or always remain the same. In another embodiment, the award values are randomly generated from a set of values, such as those illustrated in table 82 of FIG. 5. The award values may represent any suitable award. In one embodiment, the modifier values are fixed, predetermined or always remain the same. In another embodiment, the modifier values are randomly generated from a set of values such as those illustrated in Table 84 of FIG. 6. In one embodiment, the modifier values function as multipliers. In further embodiments, the modifier values may result in the player receiving any suitable award.

Figure 7:
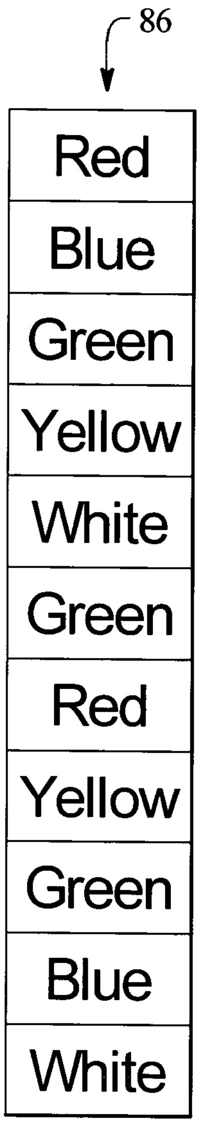
FIGS. 7 and 8 are tables illustrating possible methods for supplying characteristics for selected embodiments of the present invention.
Figure 8:
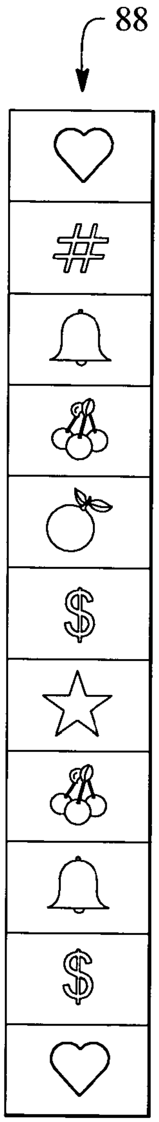

In one embodiment, the characteristics are fixed, predetermined and always remain the same. In another embodiment, the characteristics are randomly generated from a set of characteristics such as those illustrated in tables 86 and 88 of FIGS. 7 and 8, respectively. In one embodiment, the characteristics 72 are colors such as those depicted in table 86 of FIG. 7. In one embodiment, the characteristics are symbols such as those depicted in table 88 of FIG. 8. The characteristics may include any suitable indicator such as colors, symbols, images, indicia, patterns, or other displays or indications. It should be appreciated that combinations of one or more characteristics may be used in the various positions of the gaming device of the present invention. In further embodiments, the characteristics may include flashing lights, moving or interacting images, patterns, and the like (not shown).

Game Sequence

Figure 9:
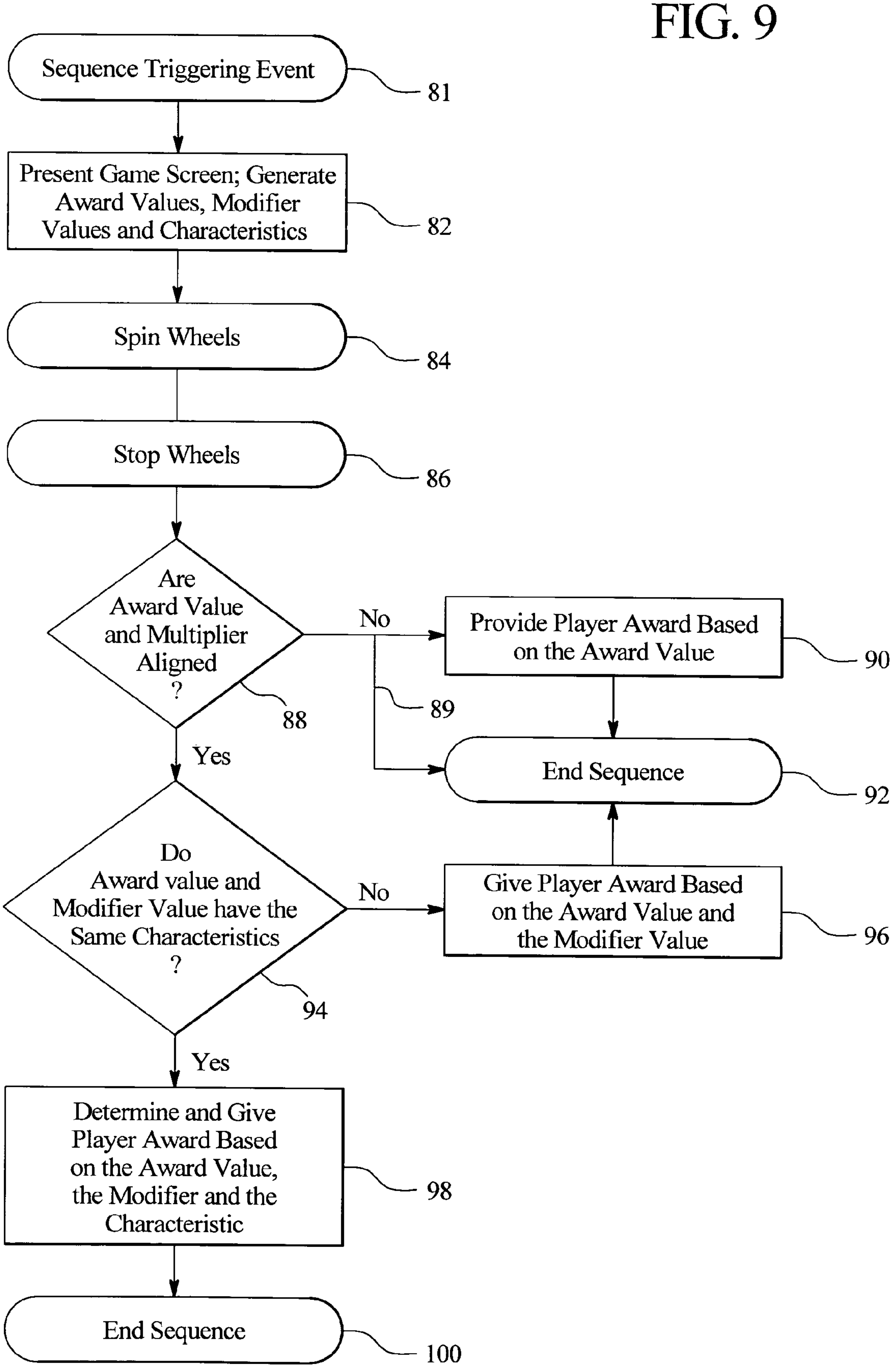
FIG. 9 is a flow diagram depicting the method of a game in one embodiment of present invention.

Turning now to FIG. 9, a flow diagram of the game sequence of one embodiment of the invention is illustrated. Upon the occurrence of a triggering event as indicated by oval 81, the display is revealed as indicated by block 82 showing a plurality of award values, modifier values and characteristics. To start the game play, the player pushes the start/spin button, which causes the wheels to spin as depicted in oval 84. In one embodiment, the gaming device enables the player to cause the wheels to stop spinning by depressing a stop button, as indicated in oval 86. In one embodiment, the processor of the gaming device determines when the wheels will start and/or stop spinning.

When the wheels come to a stop, the processor will determine whether an award value position and modifier value position are aligned along or indicated by an indicator, as indicated in diamond 88. In one alternative embodiment, the positions are always aligned. In one embodiment, if the a modifier value is not aligned with the award value, then the player receives an award equal to the award value aligned with the indicator, as indicated in block 90, and the game sequence ends as indicated in block 92. In one embodiment, if the award value and modifier value are not aligned when the wheels stop spinning, the player receives no award and the game is over, as indicated by the line 89 leading from diamond 88 to oval 92.

If an award value on the wheel is aligned with a modifier value on the wheel when the wheels come to a stop, the processor determines, as depicted in diamond 94, if the aligned award value position and modifier value position include the same or related characteristics. If the award value position and modifier value position include the same or related characteristics, the gaming device provides the player with an award determined by the award value, the modifier value and an additional award associated with the characteristics, as indicated in block 98. For example, after a spin, if the indicated award value is ten and the indicated modifier value is two, and the award value position and modifier position each include the same or related characteristics, the award given to the player may be twenty credits, plus an additional award of 100 credits associated with the same or related characteristic.

If the indicated award value and modifier value do not include the same characteristic, the player is provided an award based on the amount of the award value 68 and the modifier value, as indicated in block 96. After the awards are provided to the player, as indicated in blocks 96 and 98, the game sequence ends, as shown in blocks 92 and 100, respectively.

It should be appreciated that the gaming device of the present invention may utilize multiple indicators wherein the player may receive the awards aligned with the multiple indicators. It should further be appreciated that any suitable means of indicating winning positions may be utilized in accordance with the present invention.

ALTERNATIVE EMBODIMENTS

Figure 14:
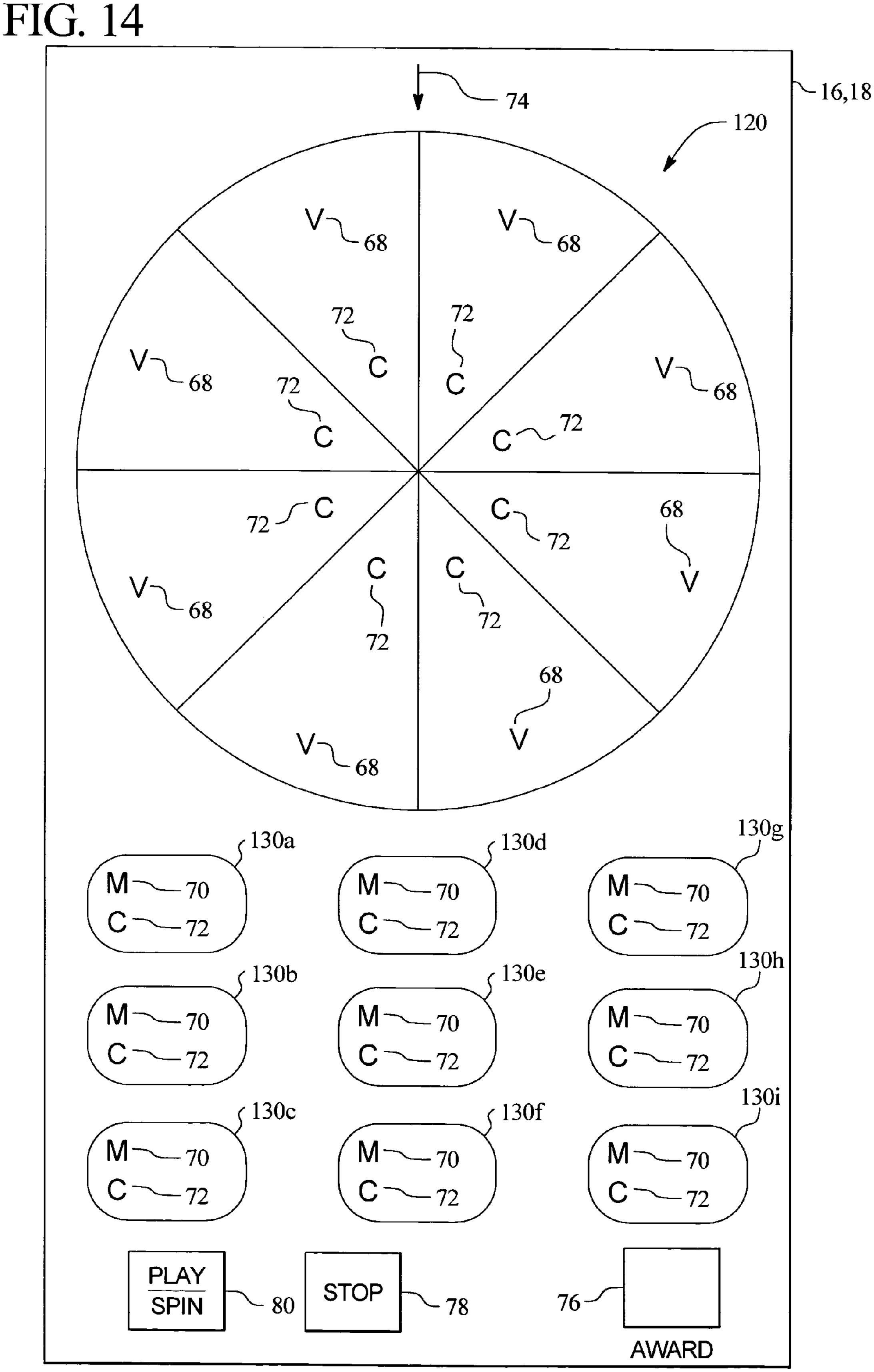
FIG. 14 is a front view of the display device illustrating an alternative embodiment of the present invention.
Figure 15:
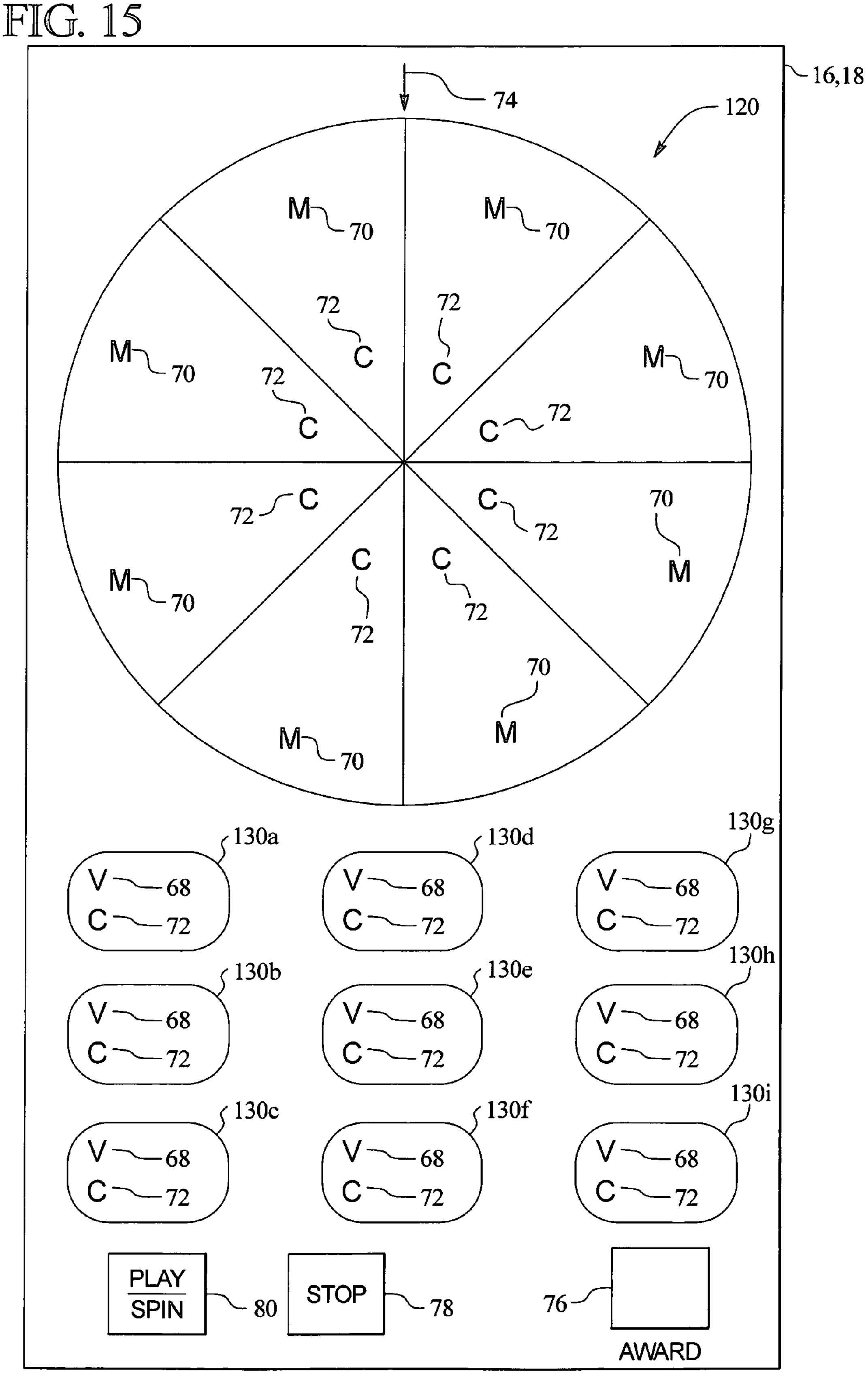
FIG. 15 is a front view of the display device illustrating an alternative embodiment of the present invention.

In one alternative embodiment of the present invention, generally shown in FIG. 14, the award values 68 are aligned in positions along a circular path or wheel 120, and one or more modifier values 70 are randomly associated with a plurality of selections 130*a* to 130*i*. The award value 68 positions and modifier value positions further each include at least one characteristic 72.

In this embodiment, an award value 68 is determined by the processor and the modifier value is determined by the player's pick of one of the selections 130*a* to 130*i*. The award is determined by the amount of the award value 68 and the modifier value 70. The award values 68 and modifier values 70 may alternatively both be generated by the processor. Similar to the embodiments described above, if the characteristics associated with a generated first position and picked second position match, the player is given an additional award.

In one alternative embodiment of the present invention, generally shown in F*ig*. 15, the modifier values 70 are aligned in positions along a circular path or wheel 120, and one or more award values 68 are randomly associated with a plurality of selections 130*a* to 130*i*. The award value 68 positions and modifier value positions further each include at least one characteristic 72.

In this embodiment, a modifier value 70 is determined by the processor and the award value 68 is determined by the player's pick of one of the selections 130*a* to 130*i*. The award is determined by the amount of the award value 68 and the modifier value 70. The award values 68 and modifier values 70 may alternatively both be generated by the processor. Similar to the embodiments described above, if the characteristics associated with a generated first position and picked second position match, the player is given an additional award.

In one alternate embodiment of the present invention (not shown), three or more groups of positions may be used in the display and game sequence of the gaming device. For example, the game may include an outer wheel with positions including award values and characteristics, a second wheel with positions including modifier values and characteristics, and a third wheel, with positions including characteristics. In this embodiment, all three concentrically displaced wheels would spin upon the occurrence of a triggering event, and the winning amount would be determined by the indicated positions at the end of the spin.

In further alternative embodiments, the positions including award values, modifiers and characteristics may be displaced in adjacent paths forming patterns of other shapes, for example, an oval shape, or a square shape. Upon the occurrence of a triggering event, an indicator would move along the paths. In another embodiment, the positions may be displaced along adjacent open paths such as a line or curved path.

In one embodiment, the gaming device may enable a player to risk an award by rejecting a generated award value and trying for another. The game sequence in this embodiment could enable a player to earn greater rewards for risking a potential award and achieving a successful outcome in a subsequent round. Alternatively, the player may simply forfeit the risked award in lieu of a chance to earn a greater reward in a subsequent round.

EXAMPLE 1

Figure 10:
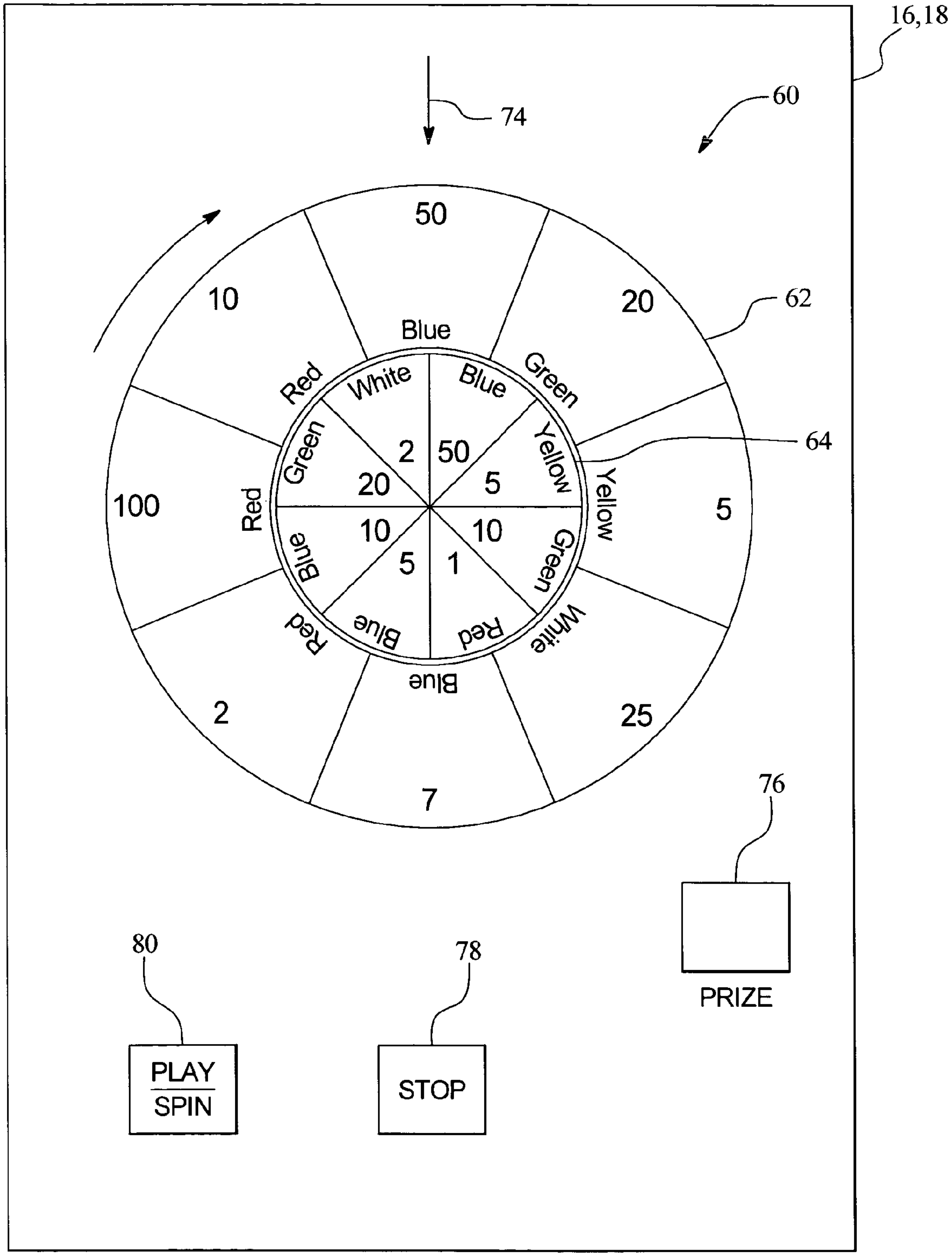
FIGS. 10 and 11 are front views of the display device illustrating an example of a game sequence in one embodiment of the present invention.

Turning now to FIG. 10, an example of the display 16 or 18 of the gaming device of the present invention is shown with each position of the outer wheel 62 containing a potential award value and a characteristic, and each position of the inner wheel 64 containing a modifier value and a characteristic. In this example, the characteristic used is a color. Upon the occurrence of a triggering event, such as the player pressing the play/spin button 80, the wheels begin to spin, either in the same direction or opposite directions. In an embodiment, the gaming device gives the player the ability to cause the wheels to stop spinning by taking a suitable action, such as pressing a stop button 78.

Figure 11:
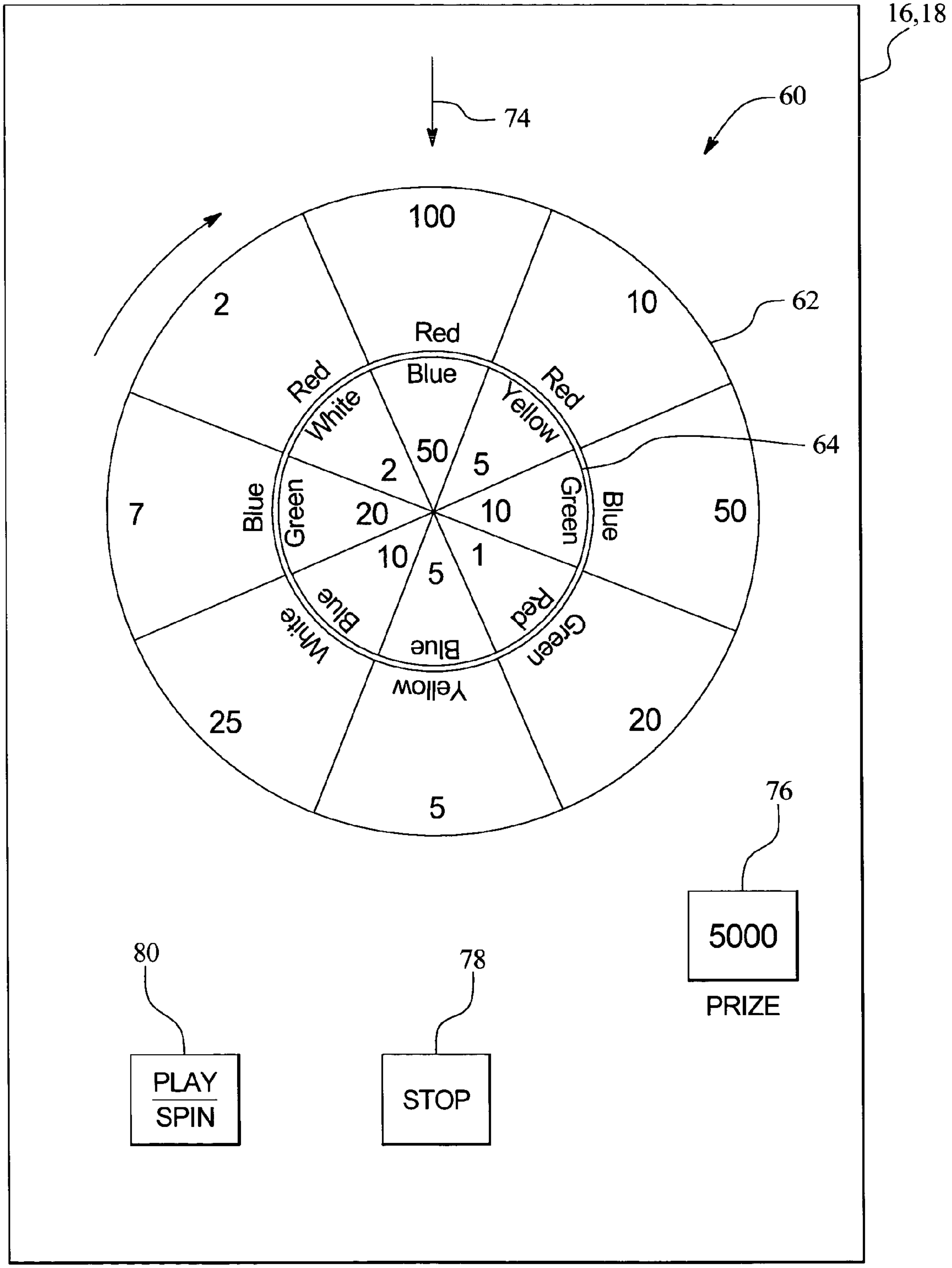

Turning now to FIG. 11, the wheels are depicted as they may appear after coming to a stop, with the indicated award value position containing a one-hundred and the indicated modifier value position containing a fifty. In addition, the aligned or indicated award value position further contains a "red" characteristic, and the modifier position contains a "blue" characteristic, thus the characteristics indicated by indicator 74 do not match. Accordingly, the award given to the player in this example would be associated with the indicated award value position and modifier position only. Assuming that the modifier is a multiplier, the award would be five thousand (fifty times one hundred) as indicated in award display 76.

EXAMPLE 2

Figure 12:
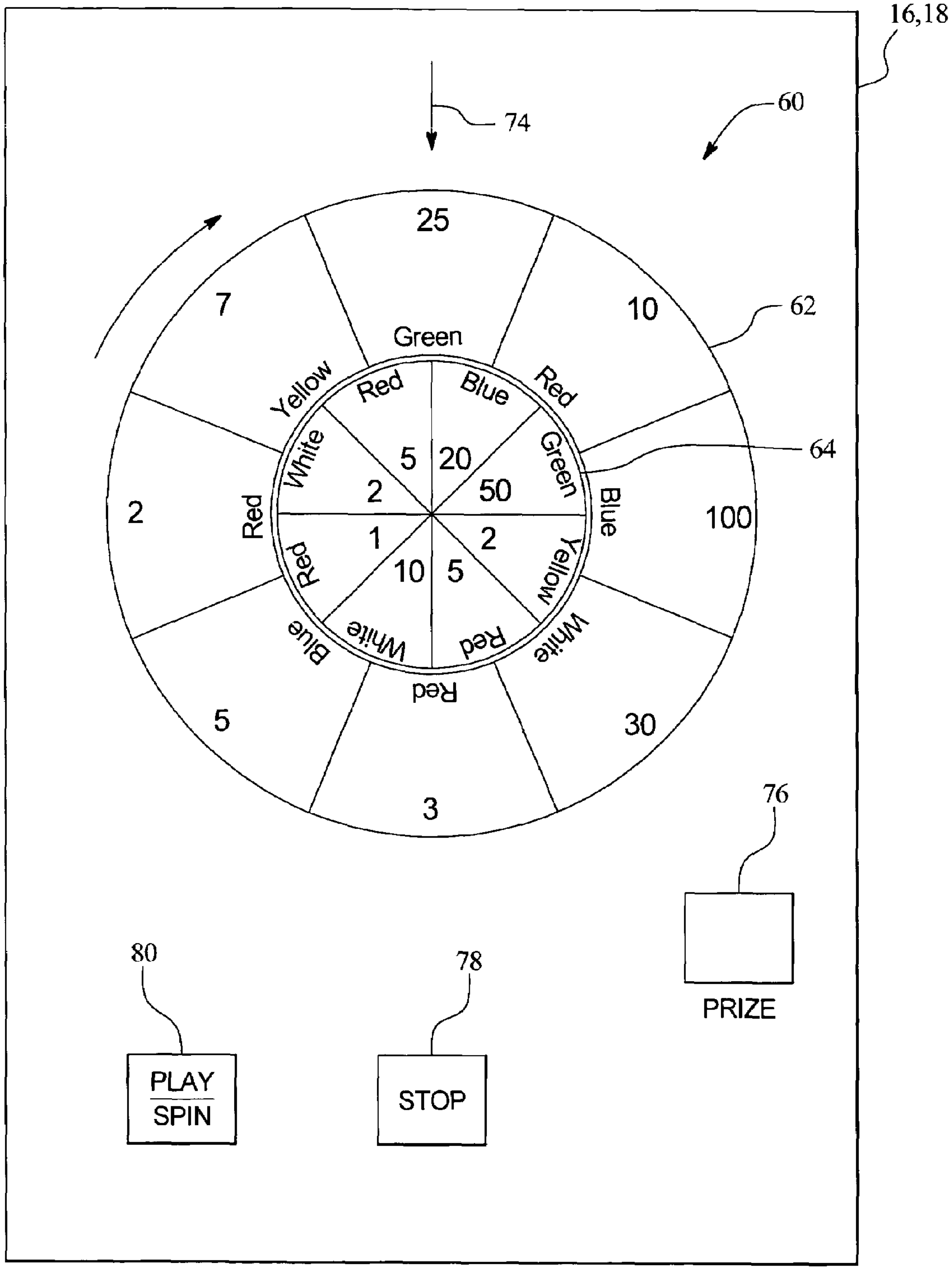
FIGS. 12 and 13 are front views of the display device illustrating an example of a game sequence in one embodiment of the present invention.

Turning now to FIG. 12, an example of the display 16 or 18 of the gaming device of the present invention is shown with each position of the outer wheel 62 containing a potential award value and a characteristic, and each position of the inner wheel 64 containing a modifier value and a characteristic. In this example, the characteristic used is again a color.

Upon the occurrence of a triggering event, such as the player pressing the play/spin button, the wheels begin to spin, either in the same direction or opposite directions. In an embodiment, the gaming device gives the player the ability to cause the wheels to stop spinning by taking a suitable action, such as pressing a stop button 78.

Figure 13:
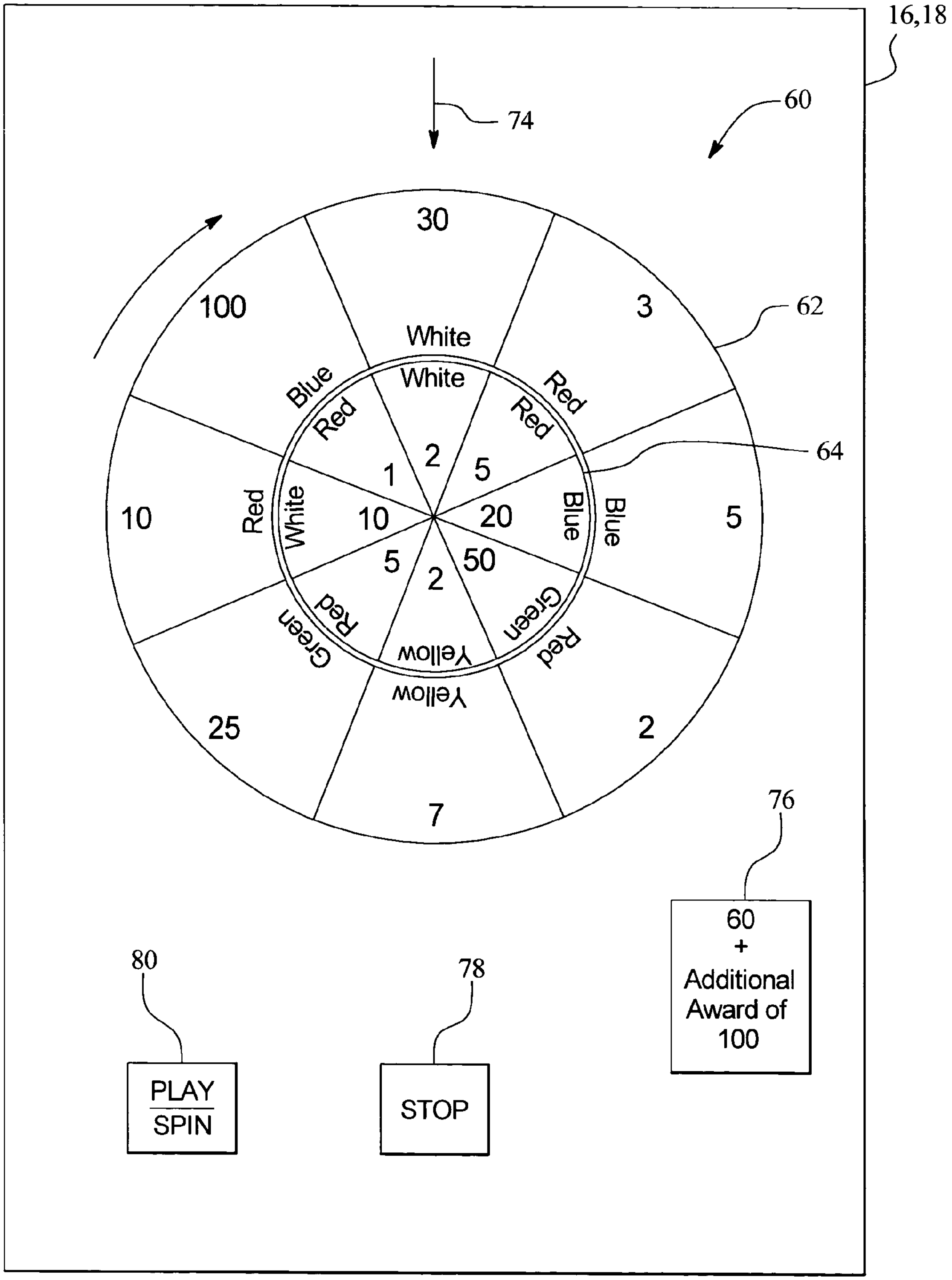

Turning now to FIG. 13, the wheels are depicted as they may appear after coming to a stop with the indicated award value position containing a value of thirty and the indicated modifier value position containing a two as indicated by indicator 74. In addition, the aligned award value position further contains a "white" characteristic, and the aligned modifier position contains a "white" characteristic, thus the aligned characteristics match resulting in an additional bonus prize to the player. Accordingly, the award given to the player in this example would be associated with the aligned award value position, the modifier position and the characteristic. Assuming that the modifier is a multiplier, the award would be sixty (thirty times two). In addition, the player would receive an additional award associated with the aligned characteristics. This additional award could take the form of a flat monetary amount additionally awarded to the player. Alternatively, the additional award could take the form of a further modifier which may, for example, double or triple the award. As a further alternative, the additional award could be a prize, free game credits for primary or secondary games, or other promotion offered to the player. In a further alternative embodiment, the game such as the bonus event may be repeated one or more times as the additional award. The additional award can thus include any suitable additional award obtained in the next play or plays of the game. In a further embodiment, if the additional award my provide the player an opportunity to accept the award based on the two elements or reject the award and try for a further greater award. Thus, the present invention includes employing an offer acceptance functionality to the matching or related characteristics.

In a further embodiment, one or more of the display devices such as a wheel is partially hidden or not displayed so that the player is unable to tell the characteristic of the next element to be displayed. In a further alternative embodiment, the characteristic may be determined or displayed after the element is selected or indicated. The characteristic may be randomly or otherwise suitably determined. It should be appreciated that the present invention contemplates various other alternatives of determining and displaying the elements and the characteristics associated with the elements.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of the game, to:

(a) generate and display at least one of a plurality of award values, at least one of the award values having at least one of a plurality of characteristics, wherein at least two of said plurality of characteristics are associated with each other;

(b) generate and display at least one of a plurality of modifier values, at least one of the modifier values having at least one of the plurality of characteristics;

(c) determine and provide an award, said award determined based on said at least one generated award value modified by said at least one generated modifier value; and (d) determine and provide an additional award if any characteristic of the generated award value and any characteristic of the generated modifier value are associated with each other.

2. The gaming device of claim 1, wherein the display device includes at least one wheel, wherein at least one of the plurality of award values or at least one of the plurality of modifier values is displayed by said wheel.

3. The gaming device of claim 1, wherein the display device includes a plurality of concentric wheels, and at least one of the generated award values is displayed by one of the concentric wheels and at least one of the generated modifier values is displayed by another of said concentric wheels.

4. The gaming device of claim 1, wherein the plurality of instructions, when executed by the at least one processor, cause the at least one processor to display a plurality of selections, wherein at least one of the plurality of award values or at least one of the plurality of modifier values are associated with the selections.

5. The gaming device of claim 4, wherein the selections are player selectable.

6. The gaming device of claim 1, wherein the plurality of characteristics includes a plurality of different characteristics, at least one of the award values has at least one of said different characteristics, and at least one of the modifier values has at least one of said different characteristics.

7. The gaming device of claim 1, wherein each of the plurality of award values has a designated one of the characteristics.

8. The gaming device of claim 7, wherein each of the plurality of modifier values has the designated one of the characteristics.

9. The gaming device of claim 1, wherein each of the modifier values has a designated one of the characteristics.

10. The gaming device of claim 1, wherein the modifier values each include a multiplier.

11. The gaming device of claim 1, wherein the plurality of instructions, when executed by the at least one processor, cause the at least one processor to enable a player to accept or reject the determined award.

12. The gaming device of claim 1, wherein the additional award includes at least one of the group consisting of: a zero value award, an award of at least one credit, an additional modifier, at least one free game, and at least one free spin.

13. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of the game, to:

(a) generate and display at least one of a plurality of first values on one of a plurality of concentric wheels, at least one of the first values having at least one of a plurality of characteristics, wherein at least two of said plurality of characteristics are associated with each other;

(b) generate and display at least one of a plurality of second values on another one of said concentric wheels, at least one of the second values having at least one of the plurality of characteristics;

(c) determine and provide an award, said award determined based on said at least one generated first value modified by said at least one generated second value; and (d) determine and provide an additional award if any characteristic of the generated first value and any characteristic of the generated second value are associated with each other.

14. The gaming device of claim 13, wherein the plurality of characteristics includes a plurality of different characteristics, at least one of the first values has at least one of said different characteristics, and at least one of the second values has at least one of said different characteristics.

15. The gaming device of claim 13, wherein each of the plurality of first values has a designated one of the characteristics.

16. The gaming device of claim 15, wherein each of the plurality of second values has the designated one of the characteristics.

17. The gaming device of claim 13, wherein each of the plurality of second values has a designated one of the characteristics.

18. The gaming device of claim 13, wherein the plurality of instructions, when executed by the at least one processor, cause the at least one processor to enable a player to accept or reject the determined award.

19. The gaming device of claim 13, wherein the additional award includes at least one of the group consisting of: a zero value award, an award of at least one credit, an additional modifier, at least one free game, and at least one free spin.

20. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of the game, to:

(a) generate and display at least one of a plurality of first outcomes on one of a plurality of concentric wheels, at least one of the first outcomes having at least one of a plurality of characteristics, wherein at least two of said plurality of characteristics are associated with each other;

(b) generate and display at least one of a plurality of second outcomes on another one of said concentric wheels, at least one of the second outcomes having at least one of the plurality of characteristics;

(c) determine and provide an award, said award determined based on said at least one generated first outcome modified by said at least one generated second outcome; and (d) determine and provide an additional award if any characteristic of the generated first outcome and any characteristic of the generated second outcome are associated with each other.

21. The gaming device of claim 20, wherein the plurality of instructions, when executed by the at least one processor, cause the at least one processor to generate an additional one of said characteristics, wherein said additional award is increased if said additional characteristic is associated with any of: (a) any characteristic of the generated first outcome, and (b) any characteristic of the generated second outcome.

22. A method of operating a gaming device having a game operable upon a wager, for each play of the game, said method comprising:

(a) displaying a plurality of concentric wheels;

(b) displaying a plurality of first values on one of the wheels, at least one of the first values having at least one of a plurality of characteristics, wherein at least two of said plurality of characteristics are associated with each other;

(c) displaying a plurality of second values on another one of said wheels, at least one of the second values having at least one of the characteristics;

(d) displaying an indication of one of the first values;

(e) displaying an indication of one of the second values;

(f) determining and providing a player an award, said award determined based on the indicated first value modified by the indicated second value; and (g) determining and providing the player an additional award if the characteristic of the indicated first value and the characteristic of the indicated second value are associated with each other.

23. The method of claim 22, which includes displaying any characteristic of each of the first values and displaying any characteristic of each of the second values.

24. The method of claim 22, which includes enabling the player to accept or reject the determined award.

* * * * *

UNITED STATES PATENT AND TRADEMARK OFFICE

CERTIFICATE OF CORRECTION

PATENT NO. : 7,448,948 B2
APPLICATION NO. : 10/657588
DATED : November 11, 2008
INVENTOR(S) : Hughs-Baird et al.

It is certified that error appears in the above-identified patent and that said Letters Patent is hereby corrected as shown below:

ON THE TITLE PAGE:

In References Cited, U.S. Patent Documents, Pg. 2, change “6,056,642 A 5/2000 Bennett” to --6,056,642 A 5/2002 Bennett--.

Signed and Sealed this

Third Day of February, 2009

JOHN DOLL

*Acting Director of the United States Patent and Trademark Office*